Patented June 24, 1930

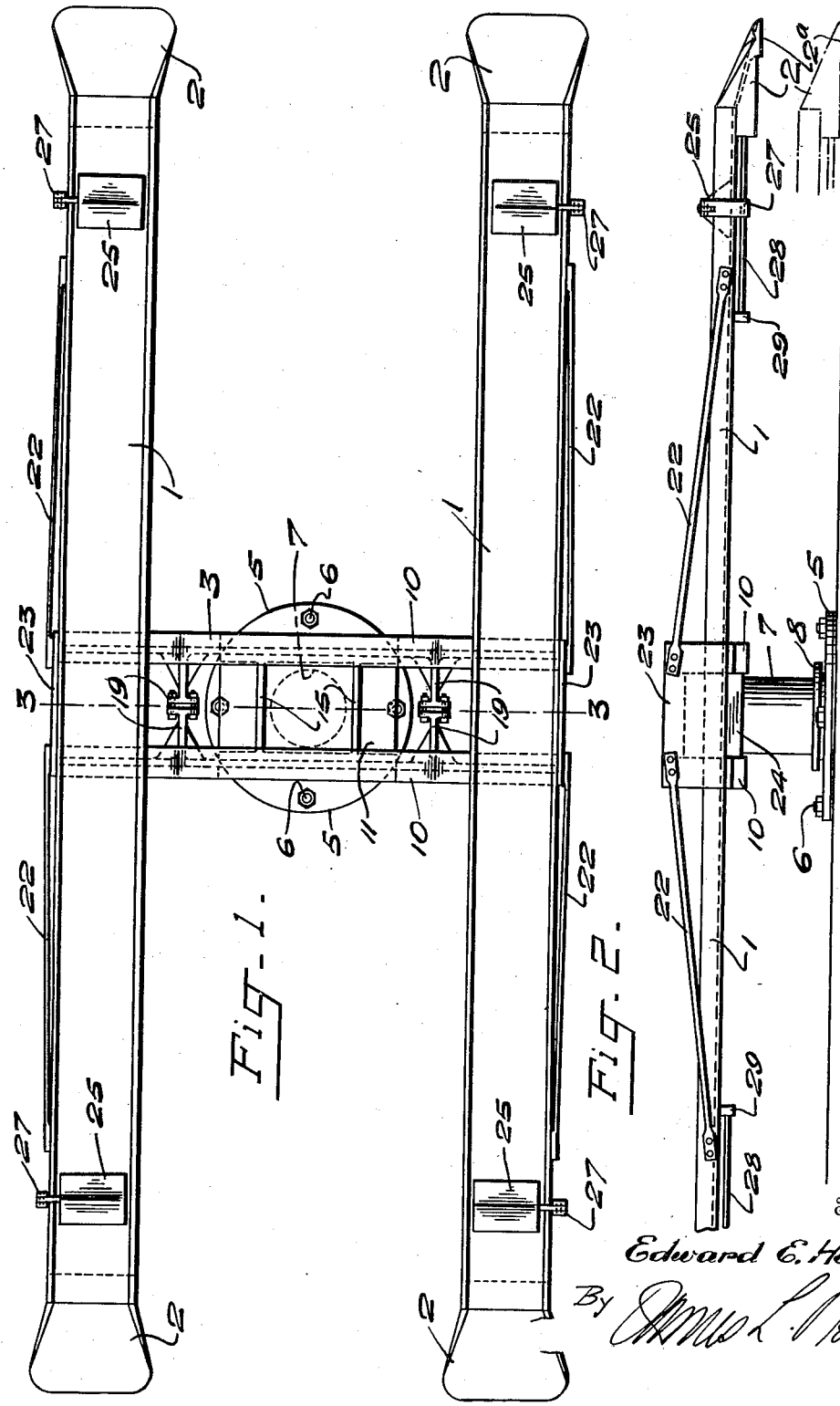

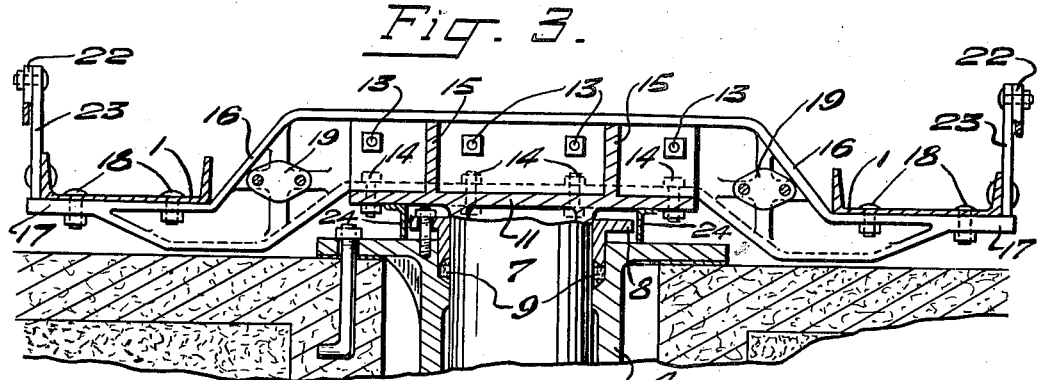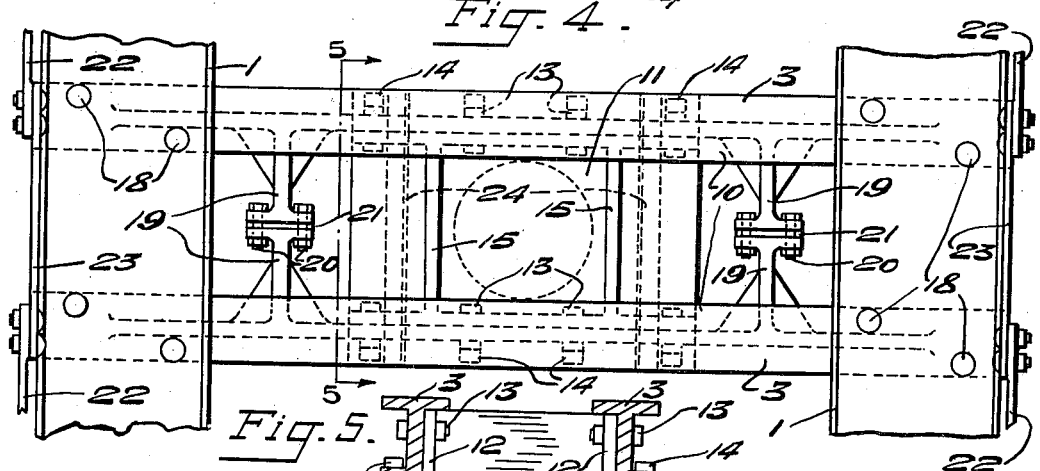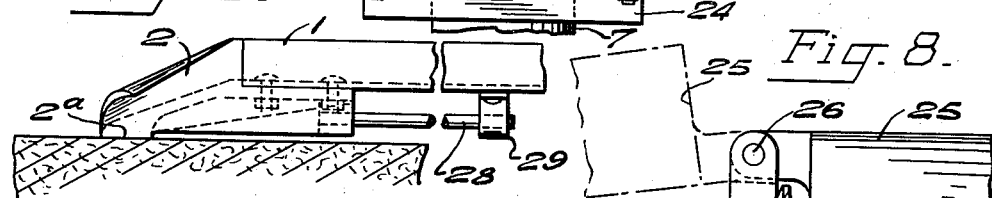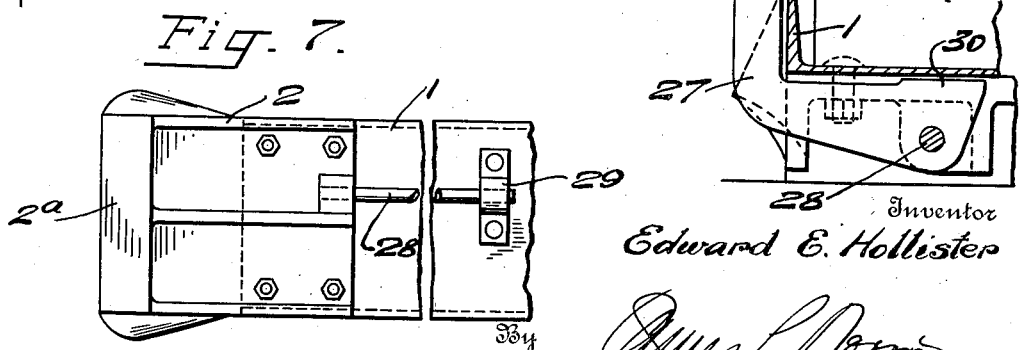

1,767,982

UNITED STATES PATENT OFFICE

EDWARD E. HOLLISTER, OF QUINCY, ILLINOIS, ASSIGNOR TO HOLLISTER-WHITNEY COMPANY, OF QUINCY, ILLINOIS, A CORPORATION OF ILLINOIS

AUTOMOBLE LIFT

Application filed August 24, 1926. Serial No. 131,261.

The present invention relates to automobile lifts of the class adapted to elevate an automobile bodily above a floor to render it accessible from beneath for inspection, servicing and repair, and the primary object of the invention is to provide improvements in a lift of this class wherein the table is so constructed that the rails on which the wheels of the automobile rest may be brought to a level sufficiently low to the floor to enable the automobile to be easily and safely moved onto the table from the floor or removed from the table to the floor, and the necessity of using a pit or depressions in the floor to receive the table or the rails is avoided, and, hence, the surface of the floor beneath the table may be continuous or unbroken, thus facilitating the operations of the workmen beneath the lifted automobile, enabling the lift to be installed on any shop or garage floor, and affording other practical advantages which will be readily apparent to those skilled in the art.

To these and other ends the invention consists in certain improvements and combinations and arrangements of parts, all as will be hereinafter more fully described, the features of novelty being pointed out particularly in the claims at the end of the specification.

In the accompanying drawings:—

Figure 1 is a top plan of an automobile lift constructed in accordance with the present invention;

Figure 2 is a side elevation of the lift as shown in Figure 1, the table being shown by the full lines in a partly raised position;

Figure 3 represents on an enlarged scale a section taken on the line 3—3 of Figure 1, the table being shown in its lowermost position;

Figure 4 is a top plan view of the intermediate portion of the lift;

Figure 5 represents a detail section taken on the line 5—5 of Figure 4;

Figure 6 is a view of an end of one of the rails of the table showing the ramp thereon in its lowermost position and resting on the floor;

Figure 7 is a bottom plan view of the ramp and the adjacent portion of the rail, as shown in Figure 6; and Figure 8 is detail view on an enlarged scale of a portion of one of the rails showing a chock block mounted thereon.

Similar parts are designated by the same reference characters in the several views.

Automobile lifts embodying the present invention may be used in garages, shops and other situations where it is desirable or necessary to bodily elevate an automobile or the like above the floor for the purpose of facilitating inspection, servicing or repair of the automobile, or for other purposes, and in the preferred embodiment of the invention as herein shown, the lift may be utilized as a turntable for the purpose of turning an automobile.

The preferred embodiment of the invention is shown in the accompanying drawings and will be hereinafter described in detail, but it is to be understood that the invention is not restricted to the precise construction shown, as equivalent constructions are contemplated, and such will be included within the scope of the claims.

In the present instance, the lift embodies a table on which the automobile is placed, and means for elevating the table whereby the automobile thereon is lifted bodily. The table comprises a pair of rails 1 which are preferably formed of a pair of channel irons or other trough-shaped members of suitable length and spaced apart the proper distance to receive the wheels of the automobile, and the ends of the rails are preferably provided with ramps 2 which may be formed of castings bolted or otherwise secured to the ends of the channel-shaped rails, these ramps providing suitably inclined surfaces which extend from the floor level to the level of the rails, when the table is in its lowermost position, and over which the wheels of the automobile may pass without obstruction when the automobile is being placed upon or removed from the table, the construction shown enabling the automobile to be driven under its own power onto or off the table. The rails are connected and supported at the middle or at points intermediate their ends by a bolster 3, this bolster serving to support the rails and being connected to means for elevating and lowering the table such as a fluid pressure operated plunger and cylinder or equivalent means. It is most convenient to employ an air cylinder and plunger for elevating the table, as a source of compressed air is usually available in garages and shops, an air cylinder 4 being shown in the present instance which is set vertically in a hole formed in the floor, the top of the cylinder having a flange 5 which rests on the floor and is anchored in place by suitable bolts 6, and the cylinder contains a plunger 7 which is movable vertically therein under the action of air which may be admitted to the cylinder to act against the lower end of the plunger, a fluid-tight joint being maintained between the plunger and the cylinder by a stuffing box gland 8 and a packing 9. The bolster forming part of the table is secured to the top of the plunger whereby rising of the plunger under the action of air admitted to the cylinder will raise the table and an automobile thereon and release of air from the cylinder will allow the table and plunger to descend by the weight of these parts and the automobile resting thereon.

It is desirable that the stuffing box or plunger be located at a level above the floor to render it readily accessible for re-packing and similar purposes, the stuffing box being so illustrated in Figure 3. It is also desirable that the bolster 3 extend beneath the rails in order to firmly support them under the weight of an automobile resting thereon. It is also desirable that the rails be supported at the center in a manner which leaves unobstructed the maximum length of the space between the rails, so that any part of the mechanism of the automobile may be reached for inspection, servicing or the performance of work thereon. The bolster provided by the present invention fulfills all of these requirements. It consists of a pair of transverse members 10 which may be made of steel castings having preferably an I-beam cross-section to afford the requisite rigidity. The middle portions of these transverse members, which are arranged in parallelism, rest upon the top of a head 11 which is fixed to or formed as a part of the upper end of the plunger 7. Preferably, the head 11 is formed with upwardly projecting flanges 12 which fit against the inner sides of the vertical webs of the cross members of the bolster and are secured thereto by bolts 13 or other suitable means, the lower inner flanges of the cross members being removed or omitted to accommodate these flanges on the plunger head. The lower outer flanges of the bolster members are preferably secured to the top of the plunger head by bolts 14. The flanges 12 of the plunger head are preferably connected by cross flanges 15 to insure rigidity.

The intermediate portion of the bolster which is mounted on the plunger head occupies a position a sufficient distance above the floor level to accommodate the plunger stuffing box, and in order to enable the rails to occupy a level as low as possible to the floor, the ends of the bolster members are inclined or otherwise offset downwardly as at 16 as these bolster members extend outwardly or toward the rail, and the ends of the bolster members are reduced in vertical height and formed with flat seats 17 which extend beneath the rails and are secured thereto by the bolts 18 or other suitable means. By forming the bolster in the manner described, its intermediate portion may rest on and extend across the top of the head on the plunger thereby insuring a firm support of the table on the plunger, although the stuffing box for the plunger is above the floor level, while the rails are so supported by the bolster that they may be lowered to a level only slightly above the floor. While the intermediate portion of the bolster which is between the rails projects above these rails, it is accommodated within the road clearance of automobiles of the conventional type so that no part of the automobile will collide with this portion of the bolster while being placed on or removed from the table.

In order to reinforce the bolster members to resist torsional stresses due to unequal distribution of weight upon the ends of the rails, the bolster members are preferably provided at their inner sides with brackets 19 which may be rigidly bolted to or cast integral with these members, these brackets being located at opposite sides of the center of the bolster and the brackets on one member being flanged and facing the brackets on the other bolster member, the brackets being immovably joined or secured together by bolts 20 which extend through the flanges of the opposed brackets and clamp the opposed brackets firmly against one another or against an interposed shim 21, these brackets effectually preventing twisting of the bolster under torsional stresses that may be imposed upon the rails.

The rails are preferably reinforced to prevent sagging thereof at their ends by tension members 22 which may be fixed to the outer flanges of the respective rails and extended upwardly toward the center of the length thereof, at which point these tension members are fixed to plates 23 which are riveted or otherwise secured to the outer flanges of the rails, any tendency of the rails to sag being sustained by the tensile strength of these tension members. By locating these tension members at the outer sides of the rails, obstruction to the free movement of an automobile onto or off the table is avoided, and they do not impair accessibility to the under side of an automobile on the table.

The ramps 2 at the ends of the rails have feet 2ª thereon which are adapted to rest on the surface of the floor when the table is in its lowermost position, the ramps thus serving to steady the table and thus prevent tilting thereof while the wheels of an automobile are moving into or off the rails. In order to prevent striking of the plunger head 11 against the stuffing box 8 when the table is lowered, spacing flanges 24 are preferably secured to the under side of the plunger head so that they will straddle the stuffing box and come to rest on top of the cylinder flange 5 as the table reaches its lowermost position. These flanges are of sufficient vertical height to prevent the plunger head from striking the stuffing box or its bolts, as will be clear from Fig. 3, and these flanges will also prevent the outer ends of the bolster from striking the floor.

Means is provided for chocking the wheels of an automobile on the table after the same has been placed thereon, such chocking means being carried by the table so that they will be within convenient reach, although they will not obstruct the wheels of the automobile while the latter is being placed on or removed from the table. As shown, a set of chocking blocks 25 is provided, there being one block for each of the four wheels of the automobile. Each block is preferably of triangular form, as will be clear from Fig. 2, so that its base may rest on the bottom of the channel-shaped rail while an inclined side of the block will be in position to engage the tire of the respective wheel. Each block is hinged at 26 to a bracket 27, and this bracket is arranged at the outer side of the outer flange of the respective rail and extends downwardly and thence beneath the rail and is slidable on a rod 28 which is attached at one end to the adjacent ramp 2 and is fixed at its opposite end to a lug 29 secured to the bottom of the respective rail. The pivoting of the block in the manner described enables it to be swung upwardly and outwardly to clear the rail preparatory to the placing of an automobile on the table or its removal therefrom, and after the automobile has been placed on the table the block may be swung inwardly and downwardly so that it engages the bottom of the rail, and by sliding the blocks against the wheels of the automobile the latter will be held against endwise movement on the table. The rails 28 to which the chocking blocks are connected allow of the chocking blocks to be shifted longitudinally of the rails within the necessary limits to accommodate automobiles having different wheel bases, but swinging of the chocking blocks to positions beneath the rails is prevented by a lug 30 formed on each bracket 27 and arranged to engage the under side of the rail to limit the downward swing of the bracket 27 and the chocking block thereon. The bracket 27 and rail 28 are accommodated in the shallow space available between the bottom of the rail and the foot of the ramp, as will be clear from Figures 2 and 6.

The operation of an automobile lift constructed as hereinbefore described is as follows:—While the table is in its lowermost position, with the feet of the ramps resting on the floor and the chocking blocks swung into position to clear the rails, the automobile is driven by its own power or otherwise run upon the rails so that its wheels occupy positions about equidistant of the ends of the rails, after which the chocking blocks are swung inwardly onto the rails and are moved into position against the wheels to block them and thereby prevent endwise displacement of the automobile. Air or fluid pressure is then applied to the cylinder, the plunger being thereby forced upwardly, causing the table and the automobile to be lifted until the desired height has been reached to enable the workman, standing on the floor, to reach any part of the automobile requiring inspection, servicing or repair. By avoiding the use of a pit in the floor, the workman is enabled to perform his duties beneath the automobile with safety and facility. The table is lowered by releasing the air or fluid pressure from the cylinder, the feet of the table settling down upon the floor, and after the chocking blocks have been removed, the automobile may be driven or otherwise run directly from the table onto the floor. In using the device as a turntable for turning automobiles, the table may be lifted to a suitable height, after the automobile has been placed thereon, and then rotated through the desired angle about the plunger as an axis, the plunger being cylindrical so that it may rotate freely in the cylinder, and after the table has been thus turned, it may be lowered and the automobile removed therefrom onto the floor.

By extending the transverse rail supporting bolster across the top of the head of the plunger or lifting device, a connection of great strength is afforded between these parts, and furthermore, the dimension of the bolster, measured in the direction of the length of the rails may be reduced to a minimum, thus affording maximum clear or unobstructed spaces between the rails for access to the underside of the various mechanisms or units of an automobile resting on the rails when the table is raised.

Although the stuffing box for the plunger preferably projects above the surrounding floor so that it may be readily accessible for adjustment or repacking, and this raised position of the stuffing box will prevent the intermediate portion of the bolster which extends across the top of the plunger head from descending to the floor level, yet the offsetting of the rail supporting ends of the bolster to a level below that of its intermediate portion enables the rails to be supported most securely on the bolster and it permits the rails to descend to a level only slightly above the floor level so that the rolling of an automobile on or off the rails may be accomplished quickly and with ease.

The feet of the ramps which are fixed to the ends of the rails are correlated to the lowermost position which is reached by the bolster when the table is fully lowered, whereby the ramps will rest on the floor when the table is fully lowered and they will thus support the ends of the rails and prevent tipping of the table while the wheels of an automobile are riding on or off the table. It will be understood that the automobile should be placed on the table, preparatory to lifting thereof, so that its weight is substantially balanced longitudinally thereof, and the chocks provided are capable of adjustment to the wheels of different automobiles when so positioned on the table.

I claim as my invention:—

1. An automobile lift comprising a lifting device, a table mounted centrally thereon and having rails to receive the automobile wheels, a stop at the center of the table for limiting its descent, and ramps at the ends of the rails arranged to rest on a floor when the table is in its lowermost position and operative to prevent tipping of the table.

2. An automobile lift comprising a lifting plunger, a cylinder therefor adapted to be sunk in a floor and having a stuffing box for the plunger which is located above the floor level, a table centrally mounted on said plunger and having rails to receive the wheels of an automobile, means toward the center of the table for limiting its descent relatively to said stuffing-box, and ramps at the ends of the rails arranged to rest on the floor when the table is lowered and operative to support the ends of the rails.

3. An automobile lift comprising a fluid pressure actuated lifting plunger, a cylinder therefor and a stuffing-box for said plunger at the upper end of the cylinder, a table to receive the automobile to be lifted, said table being mounted on the plunger, and stop means between the cylinder and table for limiting the descent of the plunger relatively to the stuffing-box.

4. An automobile lift comprising a fluid pressure actuated lifting plunger having a head on its upper end, a cylinder, and a stuffing-box for said plunger at the upper end of the cylinder, an automobile supporting table mounted on the head of the plunger, and a pair of stops on the under side of the plunger head arranged to descend at opposite sides of the stuffing-box and to abut against the cylinder to arrest the descent of the table.

5. In an automobile lift, a table having rails to receive the wheels of an automobile, and chocking devices for the wheels of the automobile resting on said rails each comprising a chocking block shaped to rest on the rail, a bracket to which the block is pivoted whereby the block may be swung into and out of engagement with the rail, and a rod to which a bracket is attached, said rod being connected to and extending longitudinally of the respective rail and slidably engaging said bracket.

In testimony whereof I have hereunto set my hand.

EDWARD E. HOLLISTER.